United States Patent
Ahmad

(10) Patent No.: US 9,495,302 B2
(45) Date of Patent: Nov. 15, 2016

(54) VIRTUALIZATION OF MEMORY FOR PROGRAMMABLE LOGIC

(71) Applicant: Xilinx, Inc., San Jose, CA (US)

(72) Inventor: Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 162 days.

(21) Appl. No.: 14/462,460

(22) Filed: Aug. 18, 2014

(65) Prior Publication Data

US 2016/0048454 A1    Feb. 18, 2016

(51) Int. Cl.
| | |
|---|---|
| G06F 12/00 | (2006.01) |
| G06F 12/10 | (2016.01) |
| G06F 13/24 | (2006.01) |
| G06F 1/32 | (2006.01) |
| G06F 13/00 | (2006.01) |
| G06F 13/28 | (2006.01) |

(52) U.S. Cl.
CPC ......... *G06F 12/1063* (2013.01); *G06F 1/3215* (2013.01); *G06F 1/3287* (2013.01); *G06F 12/1009* (2013.01); *G06F 12/1027* (2013.01); *G06F 13/24* (2013.01); *G06F 2212/502* (2013.01)

(58) Field of Classification Search
CPC .............. G06F 12/1063; G06F 12/1027; G06F 2212/502
See application file for complete search history.

(56) References Cited

U.S. PATENT DOCUMENTS

| | | | |
|---|---|---|---|
| 7,009,618 B1 | 3/2006 | Brunner et al. | |
| 7,614,056 B1* | 11/2009 | Saxe | G06F 9/455 712/34 |
| 2008/0016316 A1 | 1/2008 | Codrescu et al. | |
| 2010/0159688 A1* | 6/2010 | Rinerson | G11C 11/5685 438/598 |
| 2011/0055515 A1* | 3/2011 | Khubaib | G06F 12/0831 711/207 |
| 2012/0008674 A1 | 1/2012 | Yamamoto et al. | |
| 2012/0117301 A1 | 5/2012 | Wingard | |
| 2012/0221833 A1 | 8/2012 | Allaire et al. | |
| 2014/0040552 A1* | 2/2014 | Rychlik | G06F 12/0815 711/122 |

* cited by examiner

*Primary Examiner* — Mark Giardino, Jr.
(74) *Attorney, Agent, or Firm* — LeRoy D. Maunu

(57) ABSTRACT

A processing sub-system is configured to execute a program using a set of virtual memory addresses to reference memory locations for storage of variables of the program. A programmable logic sub-system is configured to implement a set of I/O circuits specified in a configuration data stream, each of the I/O circuits having a respective ID and configured to access one of the variables. A memory management circuit is configured to map the virtual memory addresses to physical memory addresses of a memory and map IDs to the physical address used to store the corresponding variables. A TLB is configured to receive a memory access request, from the I/O circuits, each request indicating an ID and provide, to the memory, a memory access request indicating the physical memory address that is mapped to the ID.

19 Claims, 4 Drawing Sheets

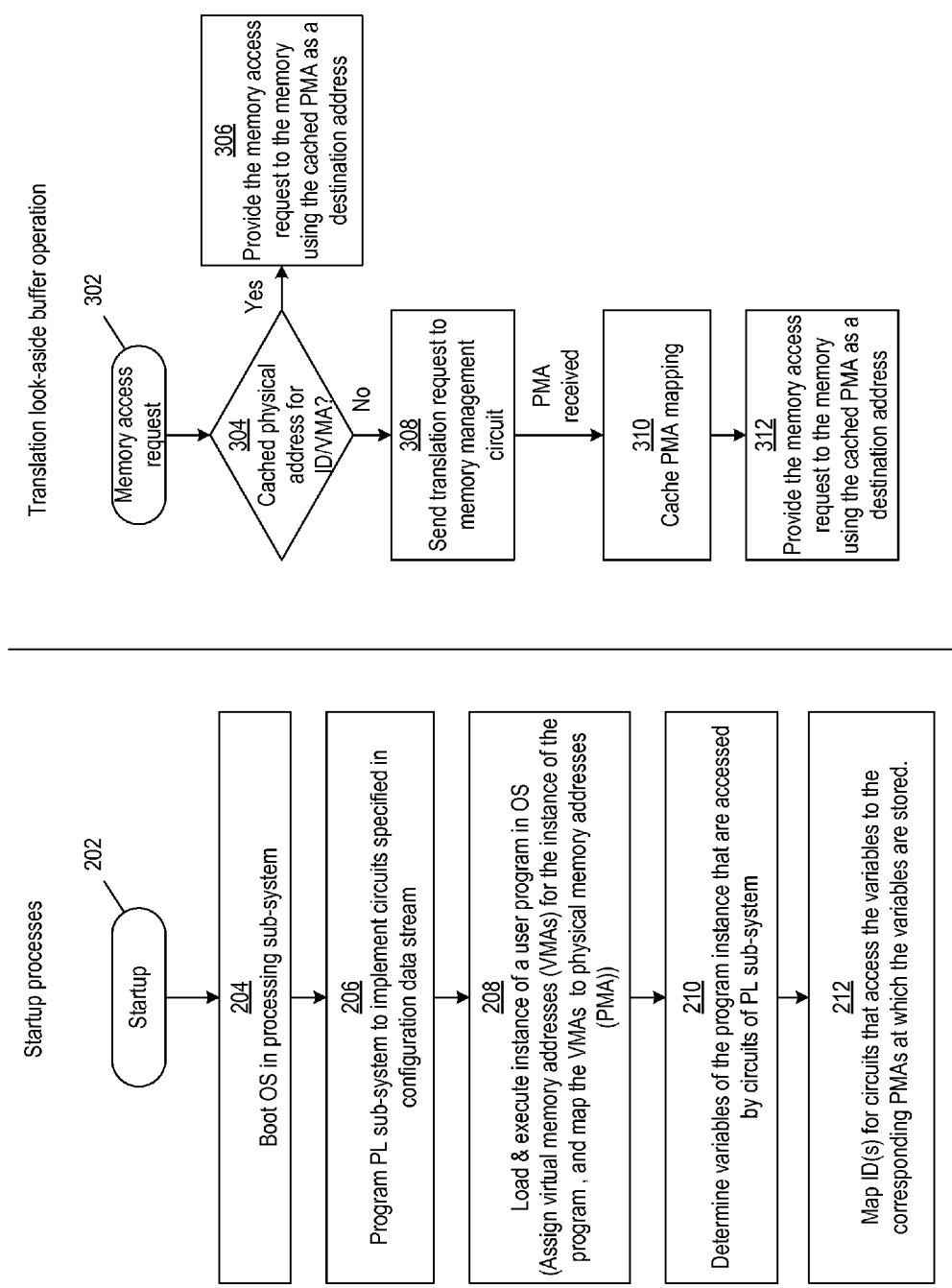

VIRTUALIZATION OF MEMORY FOR PROGRAMMABLE LOGIC

FIELD OF THE INVENTION

The disclosure generally relates to integrated circuits (ICs) and more particularly to memory virtualization.

BACKGROUND

Programmable integrated circuits (ICs) are devices that can be programmed to perform specified logic functions. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile may include both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a configuration data stream into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include an embedded processor that is capable of executing program code. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring programmable circuitry of an IC results in the implementation of different physical circuitry as specified by the configuration data within the programmable circuitry.

In some implementations, a processor of a programmable IC may utilize memory virtualization to provide more usable memory to programs. Each program executed on the processor operates as if it has access to a large portion of continuous computer memory, e.g., random access memory (RAM). Even though the physical memory used by a program may be fragmented and/or overflow onto disk storage, the program may use a virtual memory address to operate as though it is accessing a continuous collection of memory addresses. Virtual memory also allows each executing program to function as if it has access to the entirety of the physical memory of the host computer at any given time, despite having access to only a portion of the physical memory.

Implementation of virtual memory requires hardware components that aid the processor in translating virtual memory addresses (virtual addresses) utilized by the program into physical memory addresses (physical addresses) used by the hardware to read and write to memory on behalf of the program. A memory management unit is tasked with translating virtual memory addresses to physical memory addresses. The memory management unit handles memory accesses that are requested by the processor.

SUMMARY

A system is disclosed that includes a processing sub-system and a programmable logic sub-system. The processing sub-system is configured to execute a program using a set of virtual memory addresses to reference memory locations for storage of variables of the program. The programmable logic sub-system is configured to implement a set of circuits specified in a configuration data stream. Each of the set of circuits includes a plurality of input/output (I/O) circuits, each having a respective identifier (ID) and configured to access a respective one of the variables. The system also includes a memory and a memory management circuit configured to map the set of virtual memory addresses to physical memory addresses of the memory. For each of the plurality of I/O circuits, the memory management circuit also maps the ID of the I/O circuit to the physical address that is mapped to the virtual memory address of the respective variable that the I/O circuit is configured to access. The system also includes at least one translation look-aside buffer (TLB) coupled to at least one of the I/O circuits. In response to receiving a memory access request indicating an ID, the TLB is configured to provide, to the memory, a memory access request indicating the physical memory address that is mapped to the ID.

A method is also disclosed for operating a programmable IC having a processing sub-system and a programmable logic sub-system. A program is executed on the processing sub-system using a set of virtual memory addresses to reference locations of a memory for storage of variables of the program. The programmable logic sub-system is programmed to implement a set of circuits specified in a configuration data stream. The set of circuits includes a plurality of I/O circuits, each having a respective ID and configured to access a respective one of the variables. For each of the I/O circuits, the corresponding variable is accessed by providing a memory access request, indicating the ID of the I/O circuit and a virtual memory address, from the input/output circuit to one of a plurality of TLBs connected to the memory. Using the one of the TLBs, a physical memory address at which the corresponding variable is stored is determined based on the ID and the virtual memory address. A memory access request including the determined physical memory address is provided from the one of the TLBs to the memory.

Other features will be recognized from consideration of the Detailed Description and Claims, which follow.

BRIEF DESCRIPTION OF THE DRAWINGS

Various aspects and features of the disclosed methods and circuits will become apparent upon review of the following detailed description and upon reference to the drawings in which:

FIG. 2 shows a process for configuring a processing sub-system and a programmable logic sub-system at startup of a programmable IC, in accordance with one or more implementations;

FIG. 3 shows a process for translating virtual memory addresses included in memory access requests issued by a programmable logic sub-system, in accordance with one or more implementations;

DETAILED DESCRIPTION OF THE DRAWINGS

Figure 1:
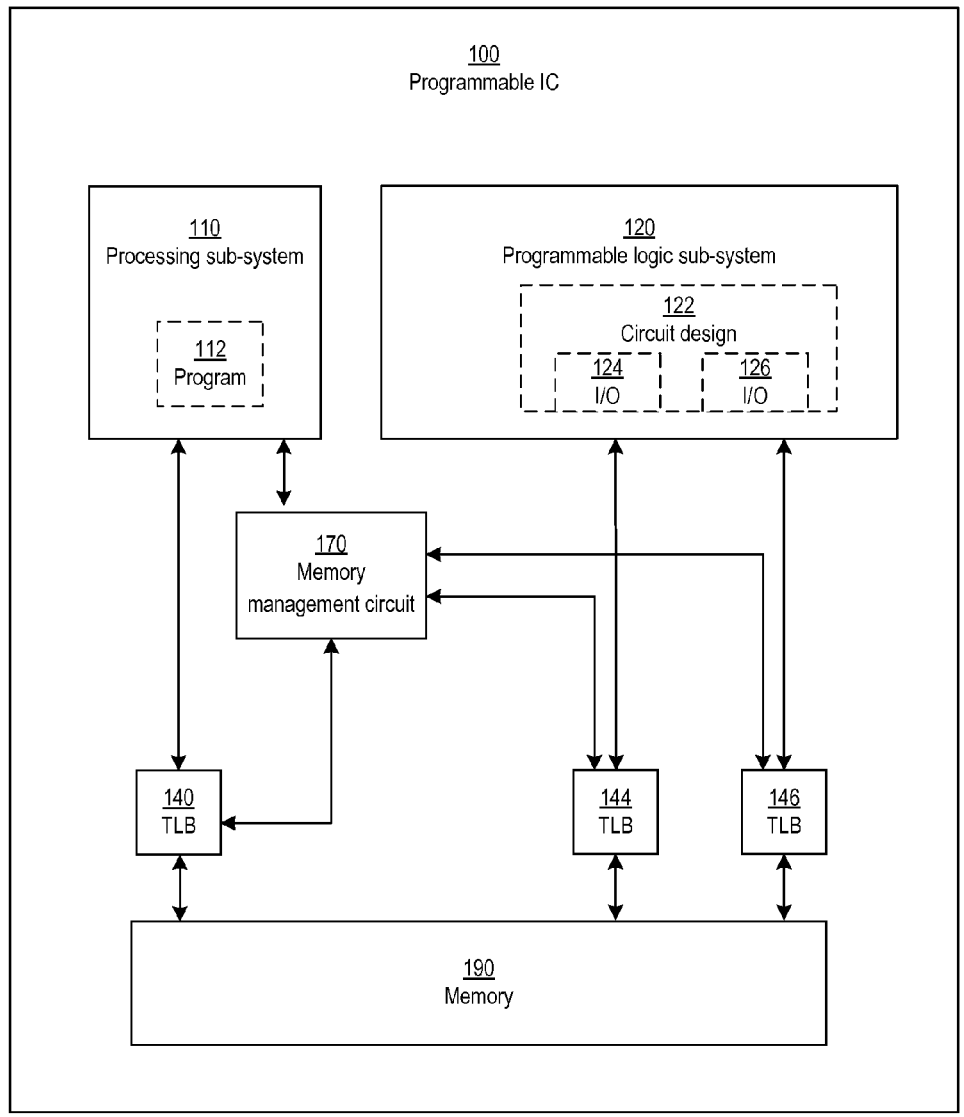
FIG. 1 shows an example programmable IC configured to perform address translation for a processing sub-system and for a programmable logic sub-system, in accordance with one or more implementations.

Use of virtual memory addresses may pose a challenge for communicating data between a software portion of a circuit design, executed in a processing sub-system of a programmable IC, and a hardware portion of a circuit design, implemented in a programmable logic sub-system. For example, variables of a program executed in the processing sub-system may be accessed by the programmable logic by accessing the memory addresses at which the variables are stored. However, when virtual memory addresses are used by the processing sub-system, it can be difficult for the programmable logic sub-system to determine which physical addresses correspond to the variables to be accessed. In some approaches, software may be executed on the processing sub-system to perform virtual memory address translation. However, this approach can be inefficient, increase software complexity, and reduce software portability.

Methods and circuits are disclosed to efficiently map and route memory access requests issued by the programmable logic sub-system to the physical memory addresses corresponding to program variables that are to be accessed. In some implementations, a programmable IC includes a processing sub-system configured to execute a program using a set of virtual memory addresses to reference memory locations for storage of variables of the program. The programmable IC also includes a programmable logic sub-system configured to implement a set of circuits, specified in a configuration data stream, which inter-operate with the program via access to one or more variables of the program. For instance, the set of circuits may include a plurality of input/output (I/O) circuits, each having a respective identifier (ID) and configured to read and/or modify a respective one of the program variables.

The programmable IC includes a memory management circuit configured to map the set of virtual memory addresses to physical memory addresses of the memory when the processing sub-system is initialized to execute the program. The memory management circuit also maps the IDs of the I/O circuits to the base physical memory addresses corresponding to the variables to be accessed. During subsequent operation of the programmable IC, memory access requests from the programmable logic sub-system are provided to one or more translation look-aside buffers (TLBs) for address translation. Each TLB is configured to determine a physical memory address corresponding to an ID and/or a virtual memory address indicated in a receive memory access request. After determining the physical memory address, the TLB provides a memory access request indicating the physical memory address to the memory on behalf of the I/O circuit.

In some implementations, the TLBs are configured to retrieve a mapping of an ID and/or virtual memory address to a physical memory address, in response to a first instance of a memory access request indicating the ID and/or virtual memory address. For instance, the mapping may be requested from the memory management circuit. The TLBs may cache the retrieved mapping of the ID and/or virtual memory address to the physical memory address for later use. Caching of an address mapping assists to reduce the address translation load that must be performed by the memory management circuit. In some other implementations, the memory management circuit may be configured to provide an address mapping table to each of the TLBs at startup, before memory address requests are generated by the programmable logic sub-system. TLBs may be implemented using various circuits. In some implementations, a TLB may cache address mapping entries using a content addressable memory (CAM). Unlike a random access memory (RAM), where data is accessed using memory address, CAM can search stored data for an entry including a specified virtual memory address and/or D. If the specified ID and/or virtual memory address is not found within the CAM, an exception can be generated that causes the physical memory address to be retrieved from the memory mapping circuit.

In some implementations, the TLBs are hardwired circuits coupled to the programmable logic and memory on the programmable IC. Alternatively or additionally, programmable resources in the programmable logic sub-system may be programmed to form some or all of the TLBs. Use of programmable resources to implement the TLBs, may allow a designer to specifically configure the programmable IC to meet the requirements of a user design. For instance, for some applications, only a small number of memory access requests may be generated to exchange data between the processing and programmable logic sub-systems. For such applications, it may be possible to perform address translation for memory access requests using a single TLB. For some other applications, a large number of TLBs may be required to perform address translation for a larger number of memory access requests.

Turning now to the figures, FIG. 1 shows an example programmable IC configured to perform address translation in accordance with one or more implementations. The programmable IC 100 includes a processing sub-system 110, a programmable logic sub-system 120, and a memory 190. The processing sub-system 110 may be configured to execute a program 112 using a set of virtual memory addresses to reference locations of the memory 190 for storage of variables of the software program. The programmable logic sub-system 120 may also be configured to implement circuit design 122 including a number of I/O circuits 124 and 126 configured to exchange data with the program 112 by accessing the physical locations of the memory 190 used to store the variables of the program.

The programmable IC includes a memory management circuit 170 configured to map the virtual memory addresses used by the program to physical memory addresses of the memory 190, at which the program variables are stored. The memory management circuit 170 is also configured to map IDs of the I/O circuits 124 and 126 to the physical memory address corresponding to the variables to be accessed.

During operation, the I/O circuits 124 and 126 access the variables stored in the memory 190 using memory access requests, such as read requests or write requests. A memory access request may indicate, for example, an ID of the I/O circuit as a source address and a virtual memory address corresponding to a program variable as a destination address. Memory access requests issued by the I/O circuits 124 and 126 are provided to TLBs 144 and 146 for address translation. In this example, the programmable IC also includes a TLB 140 configured to translate virtual memory addresses for memory access requests issued by the processing sub-system 110 during execution of the program 112.

When a memory access request is received, the TLBs 140, 144 and 146 determine a physical memory address corresponding to a virtual memory address and/or an ID indicated in the memory access request. For instance, the physical memory address corresponding to the virtual memory address and/or the ID may be requested from the memory management circuit. In various implementations, the physical memory address may be determined as a function of the ID, the virtual memory address, or both. The memory access request is then provided to the memory using the determined physical memory address as the destination address. As indicated above, after determining a physical memory address for an ID and virtual memory address, the TLB may cache an entry indicating the mapping of the physical memory address to the ID and/or virtual memory address. The cached entry may be later used to determine the physical memory address corresponding to the ID and/or virtual memory address, without contacting the memory management circuit 170.

FIG. 2 shows a process for configuring a processing sub-system and a programmable logic sub-system at startup of a programmable IC, in accordance with one or more implementations. At startup 202 of the programmable IC, an operating system (OS) is booted in the processing sub-system at block 204. At block 206, the programmable logic sub-system is programmed to implement circuits specified in a configuration data stream. At block 208, an instance of a program is loaded into the OS. As part of the loading of the instance of the program, virtual memory addresses used by the program for execution are mapped to physical memory addresses. At block 210, the process determines variables of the program that are accessed by the circuits implemented in the programmable logic sub-system. In some implementations, for example, the configuration data stream may specify variables or virtual memory addresses that are accessed by the circuits formed in the programmable logic sub-system. At block 212, IDs for the circuits that access the variables are mapped to the corresponding base physical memory addresses, at which the variables are stored.

FIG. 3 shows a process for translating virtual memory addresses included in memory access requests issued by a programmable logic sub-system, in accordance with one or more implementations. The process is initiated when the TLB receives a memory access request 302. If a physical memory address is cached for an ID and/or virtual memory address indicated in the memory access request 302, decision block 304 directs the process to block 306. At block 306, the memory access request is provided to the memory using the cached physical memory address as a destination address. Otherwise, a translation request is sent to the memory management circuit at block 308. Once a physical memory address is received from the memory management circuit, the process proceeds to block 310, where a mapping of the physical memory address to the virtual memory address and ID is cached. At block 312, the memory access request is provided to the memory using the cached physical memory address as a destination address.

Figure 4:
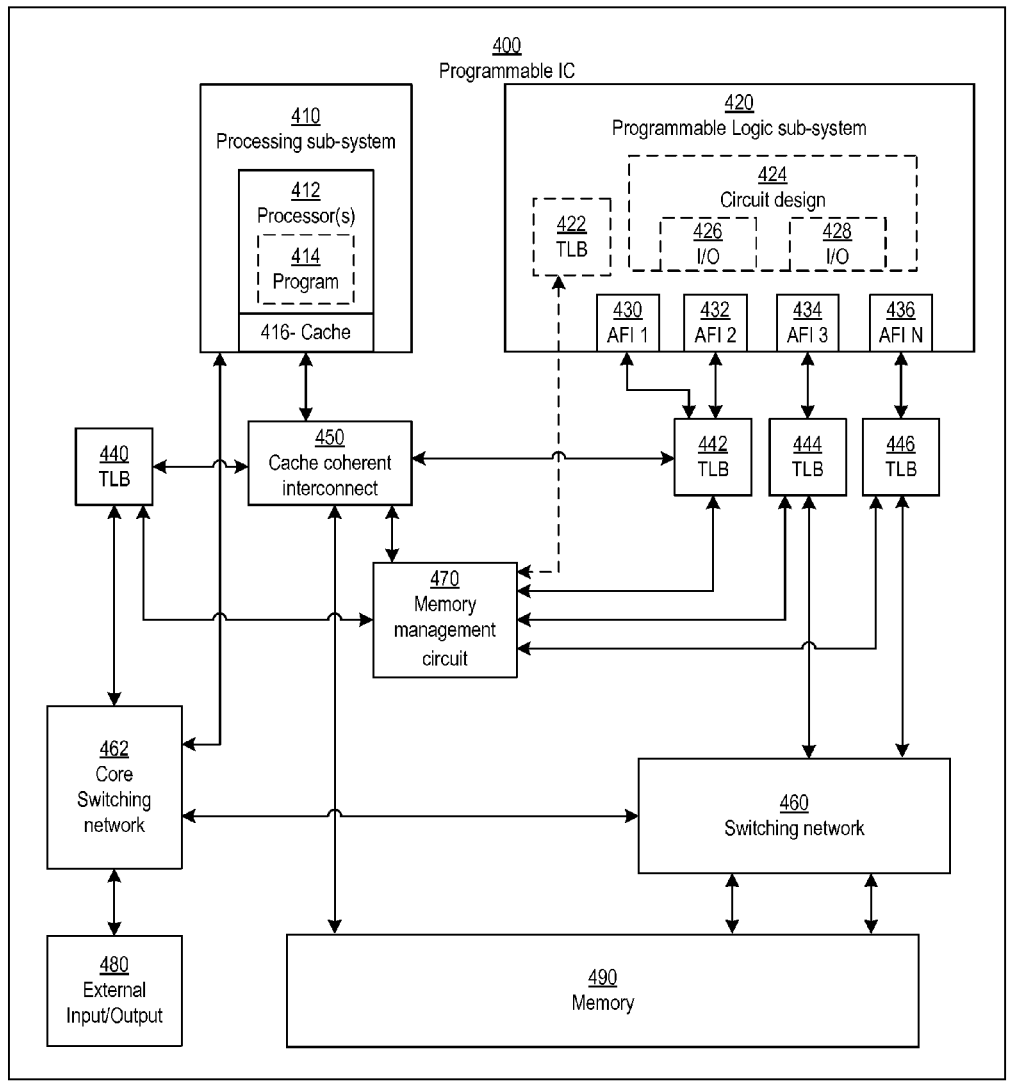
FIG. 4 shows another example programmable IC configured to perform address translation for a processing sub-system and for a programmable logic sub-system, in accordance with one or more implementations.

FIG. 4 shows another example programmable IC configured to perform address translation for a processing sub-system and for a programmable logic sub-system, in accordance with one or more implementations. The programmable IC 400 includes a processing sub-system 410 that may be configured to execute user program 414 using a set of virtual memory addresses to reference locations of a memory 490 for storage of variables of the software program. As shown in this example, the processing sub-system 410 may include one or more processors 412 for execution of the program 414. In this example, the processing sub-system 410 also includes a cache 416 to store local copies of memory locations used by the program 414. In some implementations, the programmable IC 400 includes a cache coherent interconnect 450 configured to maintain consistency between the values of cached memory locations stored in the cache 416 and those stored in the memory 490.

The programmable IC 400 also includes a programmable logic sub-system 420 that may be configured to implement a circuit design 424. The circuit design 424 includes a number of I/O circuits 426 and 428 that exchange data with the program 414 by accessing the locations of the memory 490 used to store the variables of the program.

Similar to the programmable IC shown in FIG. 1, the IC 400 includes a memory management circuit 470 configured to map the virtual memory addresses used by the program to physical memory addresses of the memory 490, at which the program variables are stored. The memory management circuit 470 also maps IDs of the I/O circuits 426 and 428 to the base physical memory address corresponding to the variables to be accessed. During operation, I/O circuits 426 and 428 access the variables stored in the memory 490 using memory access requests, such as read requests or write requests.

In this example, the programmable logic sub-system 420 includes a set of interface circuits 430, 432, 434, and 436. Each of the interface circuits 430, 432, 434, and 436, may be configured to communicate data to and/or from one or more of the I/O circuits 426 and 428 over a switching network 460 or other data bus. As one example, the interface circuits may be AXI Fabric interfaces (AFIs), configured to buffer and communicate data according to the AXI communication protocol.

In some implementations, IDs of the I/O circuits 426 and 428 may also identify which of the interface circuits 430, 432, 434, and 436 are used to communicate data. In one example implementation, a 10 bit ID (xxxxyyyyyy) may be used that uniquely identifies an interface circuit in the 4 most significant bits (xxxx). The 6 least significant bits (yyyyyy) may uniquely identify up to 64 different circuits of a user design that communicate via each interface circuit. Such IDs may also be used to identify other circuits in the programmable IC. For instance, the 4 most significant bits (xxxx) may be used to uniquely identify a processor (e.g., 412) included in the processing sub-system. The 6 least significant bits (yyyyyy) may be used to distinguish between different program instances that are executed on the processor.

In this example, the interface circuits 430, 432, 434, and 436 are connected to the switching network by TLBs 442, 444, and 446. As previously described with reference to TLBs 144 and 146 in FIG. 1, the TLBs 442, 444, and 446 are configured to perform address translation for memory access requests received from the interface circuits 430, 432, 434, and 436. Address translation may be performed with the TLBs and memory management circuit 470, for example, using the process shown in FIG. 3. After a physical memory address has been determined for the memory access request, via address translation, the TLB 442, 444, or 446 modifies the memory access request to use the determined physical memory address as the destination address. The TLB 442, 444, or 446 provides the modified memory access request to the memory 490 (via switching network 460) and/or to the cache coherent interconnect 450 to access the desired memory location. As described above, in some implementations, one or more TLBs (e.g., 422) may be implemented using the programmable resources of the programmable logic sub-system 420.

In this example, the programmable IC 400 also includes one or more external I/O circuits 480 that may be used to communicate data via one or more external data ports of the programmable IC 400. Data may be communicated between the processing sub-system 410 and/or programmable logic sub-system 420 via a core switching network 462. In some implementations, the external I/O circuit 480 may also communicate with the processing sub-system 410 by accessing the variables of the program using the memory access requests indicating the virtual memory addresses. TLB 440 is configured to perform address translation for such memory access requests, as described with reference to TLBs 442, 444, and 446.

Figure 5:
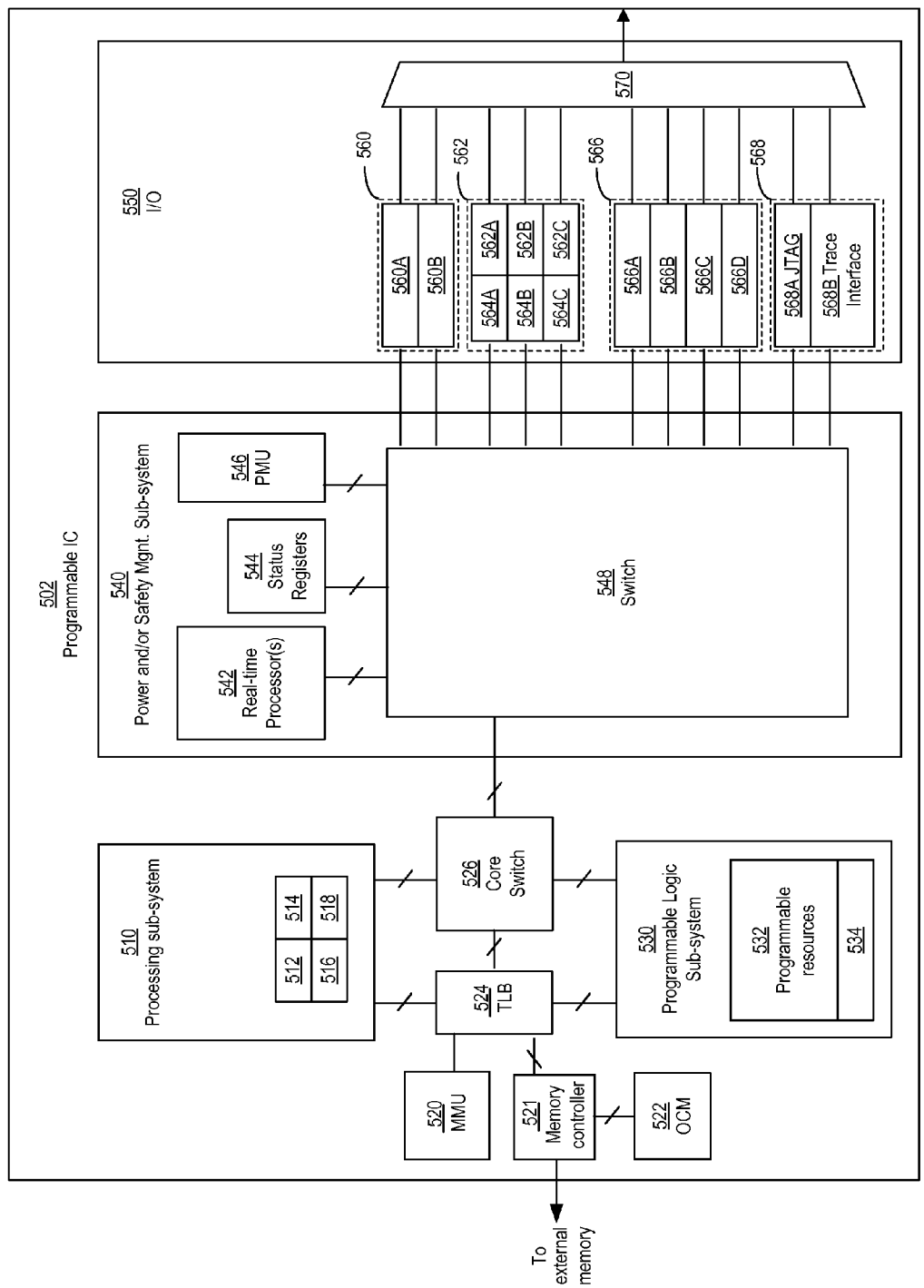
FIG. 5 shows another programmable IC that may be configured in accordance with one or more implementations.

FIG. 5 shows a programmable IC 502 that may be configured in accordance with one or more implementations. The programmable IC may also be referred to as a System On Chip (SOC), which includes a processing sub-system 510 and a programmable logic sub-system 530. The processing sub-system 510 may be programmed to implement a software portion of the user design, via execution of a user program. The program may be specified as part of a configuration data stream or may be retrieved from an on-chip or off-chip data storage device. The processing sub-system 510 may include various circuits 512, 514, 516, and 518 for executing one or more software programs. The circuits 512, 514, 516, and 518 may include, for example, one or more processor cores, floating point units (FPUs), an interrupt processing unit, on chip-memory, memory caches, and/or cache coherent interconnect.

The programmable logic sub-system 530 of the programmable IC 502 may be programmed to implement a hardware portion of a user design. For instance, the programmable logic sub-system may include a number of programmable resources 532, which may be programmed to implement a set of circuits specified in a configuration data stream. The programmable resources 532 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 532 may be programmed by loading a configuration data stream into the configuration memory cells, which define how the programmable interconnect circuits and programmable logic circuits are configured. The collective states of the individual memory cells then determine the function of the programmable resources 532. The configuration data can be read from memory (e.g., from an external PROM) or written into the programmable IC 502 by an external device. In some implementations, configuration data may be loaded into configuration memory cells by a configuration controller 534 included in the programmable logic sub-system 530. In some other implementations, the configuration data may be loaded into the configuration memory cells by a start-up process executed by the processor sub-system 510.

The programmable IC 502 may include various circuits to interconnect the processing sub-system 510 with circuitry implemented within the programmable logic sub-system 530. In this example, the programmable IC 502 includes a core switch 526 that can route data signals between various data ports of the processing sub-system 510 and the programmable logic sub-system 530. The core switch 526 may also route data signals between either of the programmable logic or processing sub-systems 510 and 530 and various other circuits of the programmable IC, such as an internal data bus. Alternatively or additionally, the processing sub-system 510 may include an interface to directly connect with the programmable logic sub-system—bypassing the core switch 526. Such an interface may be implemented, for example, using the AMBA AXI Protocol Specification (AXI) as published by ARM.

In some implementations, the processing sub-system 510 and the programmable logic sub-system 530 may also read or write to memory locations of an on-chip memory 522 or off-chip memory (not shown) via memory controller 521. The memory controller 521 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 521 is able to communicate is provided for purposes of illustration only and is not intended as a limitation or to be exhaustive. As shown in FIG. 5, the programmable IC 502 may include a memory management unit 520 and translation look-aside buffer 524 to translate virtual memory addresses used by the sub-systems 510 and 530 to physical memory addresses used by the memory controller 521 to access specific memory locations.

The programmable IC may include an input/output (I/O) sub-system 550 for communication of data with external circuits. The I/O sub-system 550 may include various types of I/O devices or interfaces including for example, flash memory type I/O devices, higher performance I/O devices, lower performance interfaces, debugging I/O devices, and/or RAM I/O devices.

The I/O sub-system 550 may include one or more flash memory interfaces 560 illustrated as 560A and 560B. For example, one or more of flash memory interfaces 560 can be implemented as a Quad-Serial Peripheral Interface (QSPI) configured for 4-bit communication. One or more of flash memory interfaces 560 can be implemented as a parallel 8-bit NOR/SRAM type of interface. One or more of flash memory interfaces 560 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 550 can include one or more of interfaces 562 providing a higher level of performance than memory interfaces 560. Each of interfaces 562A-562C can be coupled to a DMA controller 564A-564C respectively. For example, one or more of interfaces 562 can be implemented as a Universal Serial Bus (USB) type of interface. One or more of interfaces 562 can be implemented as a gigabit Ethernet type of interface. One or more of interfaces 562 can be implemented as a Secure Digital (SD) type of interface.

The I/O sub-system 550 may also include one or more interfaces 566 such as interfaces 566A-566D that provide a lower level of performance than interfaces 562. For example, one or more of interfaces 566 can be implemented as a General Purpose I/O (GPIO) type of interface. One or more of interfaces 566 can be implemented as a Universal Asynchronous Receiver/Transmitter (UART) type of interface. One or more of interfaces 566 can be implemented in the form of a Serial Peripheral Interface (SPI) bus type of interface. One or more of interfaces 566 can be implemented in the form of a Controller-Area-Network (CAN) type of interface and/or an I$^2$C type of interface. One or more of interfaces 566 also can be implemented in the form of a Triple Timer Counter (TTC) and/or a Watchdog Timer (WDT) type of interface.

The I/O sub-system 550 can include one or more debug interfaces 568 such as processor JTAG (PJTAG) interface 568A and a trace interface 568B. PJTAG interface 568A can provide an external debug interface for the programmable IC 502. Trace interface 568B can provide a port to receive debug, e.g., trace, information from the processing sub-system 510 or the programmable logic sub-system 530.

As shown, each of interfaces 560, 562, 566, and 568 can be coupled to a multiplexer 570. Multiplexer 570 provides a plurality of outputs that can be directly routed or coupled to external pins of the programmable IC 502, e.g., balls of the package within which the programmable IC 502 is disposed. For example, I/O pins of programmable IC 502 can be shared among interfaces 560, 562, 566, and 568. A user can configure multiplexer 570, via a configuration data stream to select which of interfaces 560-568 are to be used and, therefore, coupled to I/O pins of programmable IC 502 via multiplexer 570. The I/O sub-system 550, may also include a fabric multiplexer I/O (FMIO) interface (not shown) to connect interfaces 562-568 to programmable logic circuits of the programmable logic sub-system. Additionally or alternatively, the programmable logic sub-system 530 can be configured to implement one or more I/O circuits within programmable logic. In some implementations, the programmable IC 502 may also include a sub-system 540 having various circuits for power and/or safety management. For example, the sub-system 540 may include a power management unit 546 configured to monitor and maintain one or more voltage domains used to power the various sub-systems of the programmable IC 502. In some implementations, the power management unit 546 may disable power of individual sub-systems, when idle, to reduce power consumption, without disabling power to sub-systems in use.

The sub-system 540 may also include safety circuits to monitor the status of the sub-systems to ensure correct operation. For instance, the sub-system 540 may include one or more real-time processors 542 configured to monitor the status of the various sub-systems (e.g., as indicated in status registers 544). The real-time processors 542 may be configured to perform a number of tasks in responses to detecting errors. For example, for some errors, the real-time processors 542 may generate an alert in response to detecting an error. As another example, the real-time processors 542 may reset a sub-system to attempt to restore the sub-system to correct operation. The sub-system 540 includes a switch network 548 that may be used to inter connect various sub-systems. For example, the switch network 548 may be configured to connect the various sub-systems 510, 530, and 540 to various interfaces of the I/O sub-system 550. In some applications, the switch network 548 may also be used to isolate the real-time processors 542 from the sub-systems that are to be monitored. Such isolation may be required by certain application standards (e.g., IEC-61508 SIL3 or ISO-26262 standards) to ensure that the real-time processors 542 are not affected by errors that occur in other sub-systems.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. An electronic system, comprising:
a processing sub-system configured to execute a program using a set of virtual memory addresses to reference memory locations for storage of variables of the program;
a programmable logic sub-system configured to implement a set of circuits specified in a configuration data stream, the set of circuits including a plurality of input/output circuits, each input/output circuit having a respective identifier (ID) and configured to access a respective one of the variables;
a memory;
a memory management circuit configured to:
map the set of virtual memory addresses to physical memory addresses of the memory; and
for each of the plurality of input/output circuits that accesses the respective one of the variables, map the respective ID of the input/output circuit to the physical memory address that corresponds to the variable; and
at least one translation look-aside buffer (TLB) coupled to at least one input/output circuit of the plurality of input/output circuits, the at least one translation look-aside buffer configured to determine, in response to receiving a memory access request indicating an ID, a physical memory address based on the ID indicated in the memory access request and not on a virtual address, and provide to the memory a memory access request indicating the physical memory address.

2. The electronic system of claim 1, wherein:
the at least one TLB includes a cache configured to store, for one or more IDs, the mapping of the ID to the physical memory address; and
the at least one TLB is further configured to, in response to receiving a memory access request indicating an ID stored in the cache, retrieve the physical memory address that is mapped to the ID from the cache.

3. The electronic system of claim 2, wherein the at least one TLB is further configured to, in response to receiving a memory access request indicating an ID and virtual memory address not included in the cache, retrieve the physical memory address mapped to the ID from the memory management circuit.

4. The electronic system of claim 3, wherein the at least one TLB is further configured to, in response to retrieving the physical memory address mapped to the ID from the memory management circuit, cache a mapping of the ID to the retrieved physical memory address.

5. The electronic system of claim 3, wherein the at least one TLB is implemented using programmable circuits of the programmable logic sub-system.

6. The electronic system of claim 1, wherein:
at least one TLB includes a plurality of TLBs; and
further comprising a switch network configured to route memory access requests from the plurality of TLBs to the memory.

7. The electronic system of claim 6, further comprising:
a cache in the processing sub-system, the cache configured to store values of one or more physical memory locations of the memory;
a cache coherent interconnect configured to maintain consistency between the values stored in the cache and those stored in the memory; and
wherein the cache coherent interconnect is configured to receive memory access requests from at least one of the plurality of TLBs.

8. The electronic system of claim 1, wherein the programmable logic sub-system includes:
a plurality of interface circuits, each configured to communicate memory access requests from one or more of the plurality of input/output circuits to the at least one TLB.

9. The electronic system of claim 8, wherein at least one of the plurality of interface circuits is configured to communicate memory access requests from multiple ones of the plurality of input/output circuits to the at least one TLB.

10. The electronic system of claim 9, wherein for each of the plurality of input/output circuits, the ID includes a first subset of bits uniquely identifying one of the plurality of interface circuits that communicates memory access requests from the input/output circuit to the at least one TLB.

11. The electronic system of claim 9, wherein for each of the plurality of input/output circuits, the ID includes a second subset of bits uniquely identifying the input/output circuits within a subset of the plurality of input/output circuits that communicates memory access requests via the one of the plurality of interface circuits.

12. A method for operating a programmable IC having a processing sub-system and a programmable logic sub-system, comprising:
executing a program on the processing sub-system using a set of virtual memory addresses to reference locations of a memory for storage of variables of the program;
programming the programmable logic sub-system to implement a set of circuits specified in a configuration data stream, the set of circuits including a plurality of input/output circuits, each input/output circuit having a respective identifier (ID) and configured to access a respective one of the variables;
mapping the set of virtual memory addresses to a set of physical memory addresses by a memory management circuit;
mapping each respective ID to the physical memory address corresponding to the respective one of the variables by the memory management circuit;
for each of the input/output circuits, accessing the corresponding variable by performing operations including:
providing a memory access request, indicating the ID of the input/output circuit and a virtual memory address, from the input/output circuit to one of a plurality of translation look-aside buffers (TLBs) connected to the memory and memory management circuit; and
using the one of the plurality of TLBs:
determining a physical memory address based on the ID indicated in the request and not on a virtual address;
determining a physical memory address at which the corresponding variable is stored based on the ID and not on the virtual memory address; and
providing a memory access request including the determined physical memory address to the memory.

13. The method of claim 12, wherein the determining of the physical memory address at which the corresponding variable is stored based on the ID includes:
for a first memory access request received by the one of the plurality of TLBs that indicates the ID, retrieving the physical memory address mapped to the ID from the memory management circuit and storing the retrieved physical memory address in a cache of the TLB; and
for a second memory access request received by the TLB that indicates the ID, retrieving the physical memory address mapped to the ID from the cache of the TLB.

14. The method of claim 12, wherein the programming of the programmable logic sub-system includes, programming the programmable logic sub-system to implement at least one of the plurality of TLBs.

15. The method of claim 12, further comprising, using a switch network, routing memory access requests from the plurality of TLBs to the memory.

16. The method of claim 12, further comprising programming the programmable logic sub-system to implement a plurality of interface circuits, each configured to communicate memory access requests from one or more of the plurality of input/output circuits to a respective one of the plurality of TLBs.

17. The method of claim 16, wherein for each of the plurality of input/output circuits, the ID includes a first subset of bits uniquely identifying one of the plurality of interface circuits that communicates memory access requests from the input/output circuit to the respective one of the plurality of TLBs.

18. The method of claim 17, wherein for each of the plurality of input/output circuits, the ID includes a second subset of bits uniquely identifying the input/output circuit within a subset of the plurality of input/output circuits that communicates memory access requests via the one of the plurality of interface circuits.

19. The method of claim 12, further comprising:
storing values of one or more of the physical memory locations of the memory in a cache; and
providing memory access requests from at least one of the plurality of TLBs to the a cache coherent interconnect, connected to the cache and configured to maintain consistency between the values stored in the cache and those stored in the memory.

\* \* \* \* \*